United States Patent [19]

Matsumoto

[11] 4,139,295
[45] Feb. 13, 1979

[54] SAFETY DEVICE FOR AN ELECTRICALLY CONTROLLED CAMERA SLIT SHUTTER

[75] Inventor: Toshiaki Matsumoto, Toyokawa, Japan

[73] Assignee: Minolta Camera Kabushiki Kaisha, Osaka, Japan

[21] Appl. No.: 748,162

[22] Filed: Dec. 7, 1976

[30] Foreign Application Priority Data

Dec. 10, 1975 [JP] Japan .......................... 50-165752[U]

[51] Int. Cl.² .............................................. G03B 9/40
[52] U.S. Cl. .................................... 354/246; 354/243
[58] Field of Search .............. 354/238, 243, 244, 241, 354/242, 245, 246, 48, 50, 51, 258

[56] References Cited

U.S. PATENT DOCUMENTS 3,670,636  6/1972  Holle et al. .......................... 354/258
3,705,536  12/1972  Lermann ................................ 354/51
3,952,317  4/1976  Galbraith ........................ 354/246 X Primary Examiner—John Gonzales
Attorney, Agent, or Firm—Watson, Cole, Grindle & Watson

[57] ABSTRACT

An electrically-controlled shutter mechanism is provided with a pair of shutter blades, i.e., leading and trailing blades, which are to be actuated one after another within a given time interval in order to expose film to scene light through a slit formed between the blades. To ensure the formation of the slit the shutter mechanism is so constructed as to enable actuation of the trailing shutter blade after a lapse of a predetermined time period from an actuation of the leading shutter blade. The construction of the shutter mechanism also assures shutter operation with minimum exposure time when the electric shutter control is inoperable.

17 Claims, 5 Drawing Figures

SAFETY DEVICE FOR AN ELECTRICALLY CONTROLLED CAMERA SLIT SHUTTER

BACKGROUND OF THE INVENTION

The present invention relates to a safety device for an electrically controlled camera shutter mechanism, and it particularly pertains to such a device which ensures the forming of a slit between leading and trailing shutter blades.

Various types of slit shutters are already known, such as those having a pair of curtains which travel one after another in front of a film, or those having a pair of plates or disks which are respectively provided with an aperture and which are driven one after another such that their apertures overlap to form a slit for the film exposure. Electric control devices for those slit shutters are in general constructed to electromagnetically initiate a trailing shutter member, such as a curtain or a plate, in response to an electric signal generated by an electric circuit. This signal may be generated after a lapse of a time period from initiation of the leading shutter member in accordance with the scene brightness or a manually set shutter speed value. On the other hand, leading and trailing shutter members of slit shutters are generally overlapping in part with their light blocking portions to avoid unexpected exposure of the film.

Hence, it sometimes occurs that the trailing shutter member is initiated so early that the leading and trailing shutter members are driven without forming a slit, or with the formation of a slit so narrow as to cause a diffraction effect on the picture image.

On the other hand, when the electromagnetic device is so constructed that an electromagnet is previously energized to restrain the trailing shutter member at a cocked position thereof and de-energized in response to an electric signal to initiate the trailing shutter member, the shutter members can be nevertheless driven without forming a slit when the electric power source for the control circuit has been exhausted.

This no-slit shutter operation, i.e., travel of the leading and trailing shutter members without forming a slit, can generally not be recognized when the camera is operated, because the shutter is driven. One way to avoid this no-slit exposure is to warn, in an appropriate fashion, the photographer when such undesirable operation is expected to occur, such as due to too high a scene brightness or exhaustion of the source power. However, such a warning is not always noticed by the photographer.

There has been proposed another corrective measure which is to provide a delay means with the trailing shutter member or the control circuit. However, such delay means operates all the time, even at a moderate shutter speed, and it adds some delay time to the desired exposure time. This means that the shutter mechanism, including such delay means, always provides longer exposure times than is desired.

Although electronic systems have been devised in an attempt to overcome the aforementioned drawbacks, e.g., as in U.S. Pat. No. 3,683,767, they have not been found altogether satisfactory.

In U.S. Pat. No. 3,498,195 issued on Mar. 3, 1970, a shutter speed adjusting means is shown wherein an electronic circuit controls the release of a rear shutter screen after the front screen, after cocking, has been released. However, according to the particular structural setup described in this patent, the electronic circuit, and more specifically the integrating capacitor, is charged for operation only after a time lapse after the release of the front screen. Thus, if the power source therein is exhausted, the entire device is made inoperative.

Accordingly, the primary object of the present invention is to provide a shutter mechanism which is provided with a delay means for avoiding no-slit shutter operation but which does not have the drawbacks as mentioned above.

Another object of the present invention is to provide an electrically-controlled shutter mechanism wherein delay means for avoding no-slit shutter operation affects the exposure time only when necessary.

Still another object of the present invention is to provide an electrically-controlled slit shutter which can make exposure with minimum time when the electric power source has been exhausted.

Other objects and advantages of the invention will become apparent during the following discussion of the preferred embodiments with reference to the accompanying drawings.

DETAILED DESCRIPTION OF PREFERRED EMBODIMENT

Figure 1:
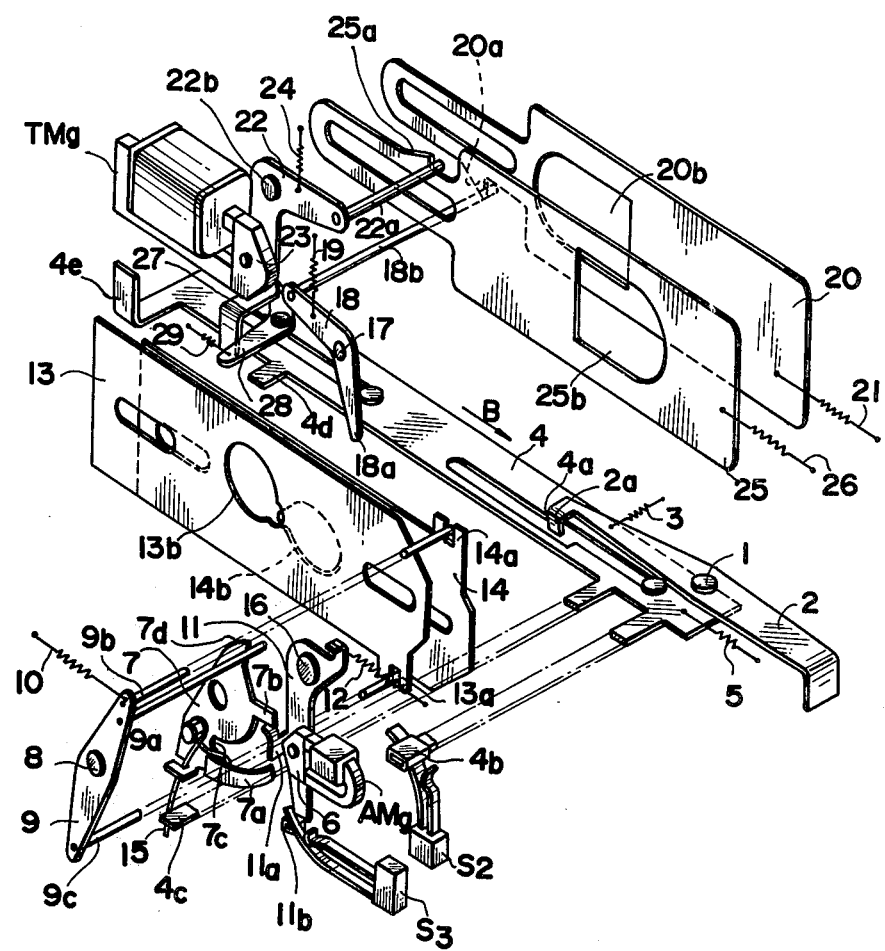
FIG. 1 is a perspective view of an embodiment of the present invention.

Referring to FIG. 1, which shows the cocked condition of a diaphragm and a shutter control mechanism including a safety mechanism for preventing no-slit shutter operation, a release lever 2 pivoted on a camera body and urged by a spring 3 in clockwise direction engages with its bent portion 2a a stepped portion 4a in a slot of an elongated operating plate 4 to restrain the latter at the cocked position thereof against a biasing force of a spring 5. The operating plate 4 is guided by a pair of pins fixed on a camera body and respectively fitted in elongated slots of the operating plate 4 so that the latter may be slid in the direction shown by an arrow B when the release lever 2 is rotated in counterclockwise direction against the force of spring 3, e.g., in response to a shutter release operation through a conventional link mechanism (not shown) with a shutter release button (also not shown). The operating plate 4 has first, second and third projections 4b, 4c and 4d and a bent arm 4e. The first projection 4b is covered with insulating material at its end and is engageable with a movable contact of a switch S2 to open the switch S2 when the operating plate 4 is at the cocked position, and to close the switch S2 when the operating plate 4 moves away from the cocked position. The switch S2 is a short circuit switch for a resistor R1. (See FIG. 2.).

The second projection 4c is engageable with a spring 15 to rotate a diaphragm control plate 7 in clockwise direction to the charged position thereof as shown in FIG. 1 with a control lever 11 being rotated counterclockwise through engagement of a projection 7b and an ear portion 11a and an armature 6, which is mounted on the control lever 11, being brought into contact with a diaphragm control magnet AMg. When the diaphragm control plate 7 has been brought to the charged position thereof, the spring 15 is disengaged from the hook portion of the diaphragm control plate 7 so that the spring 15 is charged to urge the armature 6 against poles of the electromagnet AMg and ensure the operation of the latter. When the control lever 11 is at the position where the armature 6 is in contact with the electromagnet AMg, the ear portion 11a is in the path of the arched arm 7a of the diaphragm control plate 7 to prevent the latter from rotating counterclockwise. On the other hand, when the control lever is rotated by a spring 13a from the position as shown in FIG. 1, the ear portion 11a is brought away from the path of the arched arm 7a to permit counterclockwise movement of the diaphragm control plate 7. The control lever 11 has a bent portion 11b for closing a switch S3 at the position shown in FIG. 1 and for opening the switch S3 with the movement of the lever 11 from that position.

A diaphragm driving member 9 is rockably mounted on the camera body through a pin 8 and is urged by a spring 10 in the counterclockwise direction. The diaphragm driving member is interconnected with the diaphragm control plate 7 through an engagement of pin 9a and a tapered portion 7d. A pair of pins 9b, 9c carried on the diaphragm driving member 9 respectively fit into forked portions 14a and 13a of a pair of diaphragm blades 14 and 13 which respectively have apertures 14b and 13b, these blades being slidably guided by pins (not shown) fitted in the slots of the blades. The diaphragm blades are disposed one after another to make an aperture through which image light rays enter the film. The aperture may be small when the diaphragm control plate 7 is stopped by the ear portion 11a in the counterclockwise rotation. On the other hand, if the ear portion 11a is outside of the path of the arched arm 7a to permit the rotation of the diaphragm control plate 7, the diaphragm driving member 9 is rotated counterclockwise by the spring 10 with rightward movement of the second projection 4c, so that the diaphragm blades 13 and 14 are driven in opposite directions to make the aperture larger.

A pair of shutter blades 20 and 25 are respectively provided with apertures 20b or 25b and are guided by a pin-slot guide to slide laterally with springs 21 and 26 urging the blades in the rightward direction. A first restraining lever 18 is rockably mounted on a camera body through a pin 17 with a spring 19 urging the lever 18 in clockwise direction, and has a pin 18b carried thereon which is engageable with a projection 20a of the leading shutter blade 20 to restrain the latter at the cocked position thereof against the spring 21. A second restraining lever 22 pivoted by pin 22b on a camera body and urged by a spring 24 in counterclockwise direction is provided with a bent arm and has a pin 22a carried thereon which is engageable with a projection 25a of the trailing shutter blade 25 to restrain the latter at its cocked position against the spring 26. On the lever 22 is mounted an armature 23 which can be attracted by the shutter control electromagnet TMg.

One arm 18a of the first restraining lever 18 is in the path of the third projection 4d of the operating plate 4 which is arranged to engage the arm 18a after the second arm 4c has traveled a predetermined amount and finished the diaphragm setting operation. A safety lever 28 is pivoted by a pin 27 on the camera body and is urged by a spring 29 which has a force larger than that of the spring 24 to retain the second restraining lever at its restraining position as shown in FIG. 1 even when the shutter control electromagnetic TMg is de-energized. The arm 28a of the safety lever is in the path of the bent portion 4e which is formed on the operating plate 4 at the position such that the bent position engages the arm 28a to rotate the safety lever 28 when the third projection has further traveled a predetermined distance Δα after engaging the first restraining lever 18 to turn the latter and release the leading shutter blade 20.

Figure 2:
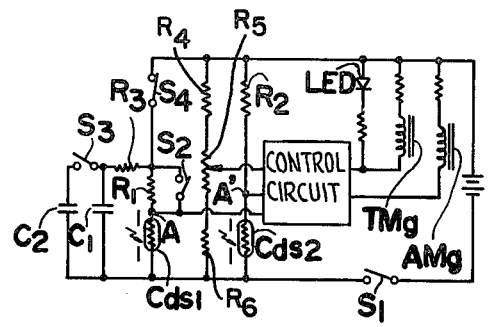
FIG. 2 is a circuit diagram showing an electric circuit for controlling the mechanism of FIG. 1.

Referring to FIG. 2, a first and second photoconductive cell CdS1 and CdS2 are respectively disposed in or on a camera body in a well known manner (not shown) to receive scene light, symbolically shown by a lightning mark in FIG. 2, through a light control aperture which may be adjusted in accordance with the film speed setting. The first photoconductive cell CdS1 is connected in series with a resistor R1 to form a first light detecting circuit when switches S1 and S4 are closed and a switch S2 is open. Upon closure of switch S2, and with the opening of switch S4, the first photoconductive cell CdS1 is operably coupled with a timing capacitor through a resistor R3 and further with an additional timing capacitor C2 through a switch S3 to form a discharge-type timing circuit. The second photoconductive cell CdS2 is connected in series with a resistor R2 to form a second light-detecting circuit for objective diaphragm aperture control. Resistors R4, R5 and R6 are serially connected with each other for generating a reference voltage at the movable contact of the resistor R5 whose contact is connected to an input of a control circuit. The control circuit has other inputs respectively connected to the first and second light detecting circuits. a light-emitting diode LED as an indicator, an electromagnet TMg for shutter control and another electromagnet AMg for objective diaphragm aperture control are respectively connected to outputs of the control circuit to be controlled such that the light emitting diode LED and the shutter control electromagnet TMg are energized when the potential at A is higher than the reference voltage, while the diaphragm-control electromagnet AMg is energized when the potential at A' is lower than the reference voltage.

Now the operation of the above embodiment from the cocked condition as shown in FIG. 1 will be explained hereinafter. At an initial stage of the shutter release operation, e.g., upon depression of a shutter release button (not shown) by a small amount, the power switch S1 is closed to energize the first and second light-detecting circuits, with the switch S4 being closed and switch S2 open. Therefore, if a scene light is under a predetermined level, for example, the critical level for a particular shutter speed, the resistance of the first photoconductive cell is high enough to make the potential at A exceed the reference voltage, and thus the light-emitting diode LED becomes energized through the control circuit which warns of such a low scene light level. If this happens, the photographer is alerted to use a photoflash or tripod.

After the confirmation of sufficient scene light level, when the photographer proceeds with the shutter release operation, e.g., when he depresses the shutter button further, the release lever 2 is rotated counterclockwise to release the operating plate 4 which slides rightwards in FIG. 1 to thereby close the switch S2 with the first projection 4b and disengage the second projection 4c from the spring 15.

If the scene light is higher than a predetermined second level, for example, an EV 13 for a film speed of ASA 100 by the unit of exposure value in accordance with APEX system, the resistance of the second photoconductive cell CdS2 is low enough to energize the diaphragm control electromagnet AMg through the control circuit. If this happens, the diaphragm control electromagnet AMg retains the control lever 11 at the position shown in FIG. 1 against the force of the spring 13a so that the ear portion 11a of the control lever 11 prevents the diaphragm control plate 7 from rotating counterclockwise to increase the aperture formed by the pair of diaphragm blades. At the same time, the switch S3 is kept in closed condition by the bent portion to connect the additional timing capacitor C2 to the first photoconductive cell.

On the other hand, if the scene light is lower than the second level, then the diaphragm control electromagnet AMg is de-energized to permit the control lever 11 to rotate clockwise and bring its ear portion 11a out of the path of the arched arm 7a so that the diaphragm control plate 7 rotates counterclockwise by the force of the spring 10 with the rightward movement of the second projection 4c and drive the diaphragm blades 13, 14 in opposite directions until the largest portions of their apertures 13b, 14b overlap each other to form the largest diaphragm aperture, e.g., f:3.5. In this case, the switch S3 is opened to disconnect the additional timing capacitor C2 from the first photoconductive cell CdS1. Thus, a small or large diaphragm aperture is automatically selected in accordance with scene light while the operating plate 4 travels rightward for a distance $a$ (see FIG. 3).

After that, the third projection 4d comes into contact with the first restraining lever 18 and turns the latter in a counterclockwise direction, and with the further travel of the operating plate 4, acts to release the leading shutter blade 20. Then the leading shutter blade 20 is driven rightward by the spring 21 to expose the film (not shown). In relation with this release of the leading shutter blade 20, the switch S4 is opened through not shown but well-known interconnection of the switch S4 with the release mechanism or the leading shutter blade, so that the timing capacitor C1 alone or both the timing capacitors C1 and C2 are discharged through the first photoconductive cell CdS1 which has a resistance as a function of scene light. After a lapse of a time period when the voltage of the capacitor or capacitors, and accordingly the potential at A, drop to a predetermined level, the control circuit de-energizes the shutter control electromagnet TMg.

In the meantime, when the operating plate 4 has traveled by a distance of $a + \Delta a$ (see FIG. 3), then the bent portion 4e comes into contact with the safety lever 28 to turn the latter counterclockwise and release its retainment of the second restraining lever 22 by the safety lever 28. Accordingly, if the shutter control electromagnet TMg is de-energized after the release of retainment by the safety lever 28, the second restraining lever 22 is turned counterclockwise by the spring 24 and the trailing shutter blade is actuated to terminate exposure immediately after that de-energization. On the other hand, when the shutter control electromagnet TMg is de-energized before the safety lever 28 is rotated to release its retainment, or else when the shutter control electromagnet is not energized from the beginning, for example due to exhaustion of a power source, then the second restraining lever 22 is retained at its restraining position as shown in FIG. 1 until the retainment is released by the bent portion 4e of the operating plate 4. Thus, a minimum exposure is ensured even if the shutter control electromagnet TMg is de-energized very early or the power source has been exhausted, and in this way no-slit shutter operation is avoided.

Figure 4:
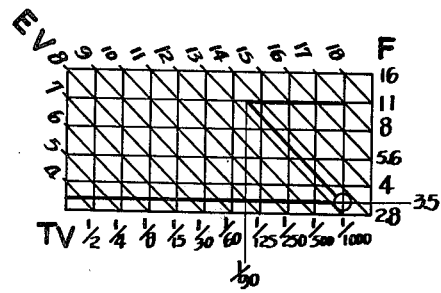
FIG. 4 is a diagram for an explanation of the operation of the shutter mechanism shown in FIG. 1.

Referring further to FIG. 4, which shows combinations between shutter speeds and diaphragm aperture, programed for the above embodiment, a large diaphragm aperture size of f:3.5 is selected with the shutter speed being changed in accordance with scene light so long as the scene light is lower than EV 14 for the film speed of ASA100, or BV 9, because the diaphragm control electromagnet AMg is not energized at such low scene light. Contrary thereto, if the scene light is higher than EV 13 for ASA100, i.e., BV 8, then a small aperture size of f:11 is selected due to energization of the diaphragm control electromagnetic AMg with the shutter speed being changed in accordance with scene light. If the scene light exceeds EV 17, then exposure is made with the small diaphragm aperture and the shutter speed determined by the time period during which the operating plate 4 travels for the distance $\Delta a$. This time period may be 1/1000 second.

Figure 3:
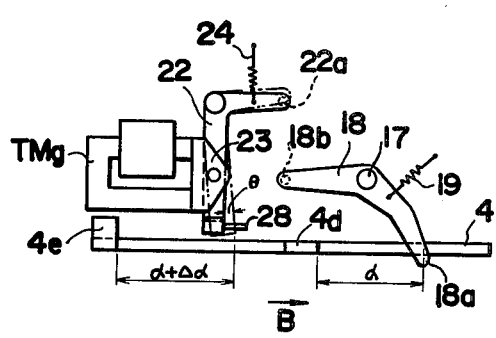
FIG. 3 is a schematic plane view of essential part of the embodiment of FIG. 1.
Figure 5:
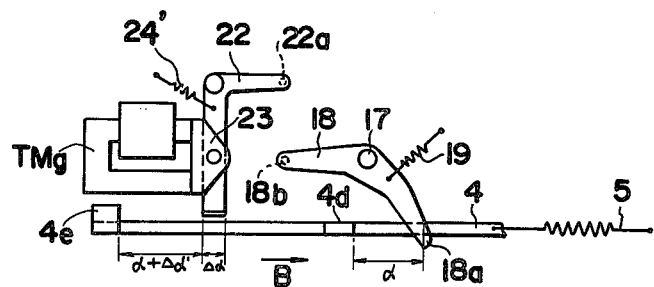
FIG. 5 is a schematic plane view of another embodiment.

FIG. 5 shows a modification of the structure of FIG. 3, wherein the safety lever is not provided, but, instead, the second restraining lever 22 is urged by the spring 24' in the direction to bring the armature into contact with the shutter control electromagnet TMg and arranged to be rotated by the operating plate 4 through the engagement or interconnection with the bent portion 4e which serves to transmit the force of spring 5 to the second restraining lever 22. In this arrangement the force of spring 5 must be stronger than that of only the spring 24' in order to drive the second restraining lever 22, but weaker than the sum of the forces of the spring 24' and attractive force of the shutter control electromagnet. In addition, the bent portion 4e is so formed as to come into contact and be interconnected with the second restraining lever 22 when the operating plate has traveled for a distance of $a + \Delta a$, while the third projection engages the first restraining lever when the operating plate has traveled for a distance of $a$. Thus, the trailing shutter blade is not actuated until the time period during which the operating plate 4 travels for a distance of $\Delta a$ has lapsed after the actuation of the leading shutter blade. A minimum shutter speed is therefore ensured.

It is further understood by those skilled in the art that the foregoing description is a preferred embodiment of the disclosed device and that various changes and modifications may be made in the invention without department from the spirit and scope thereof.

For example, the electromagnet may be replaced by a permanent magnet coupled with an electromagnetic coil to hold the trailing shutter-restraining member with the force of the permanent magnet, but to release its holding when it is energized. Further, the present invention is applicable to various types of electrically controlled slit shutter mechanisms such as referred to in the introductory part of the present invention.

I claim:

1. A slit shutter mechanism having a leading shutter member and a trailing shutter member and controllable by an electric circuit through magnetic means which restrains said trailing shutter member at a cocked position thereof for a time period determined by said electric circuit after said leading shutter member is released, said slit shutter mechanism comprising:

a first restraining member for restraining said leading shutter member at the cocked position thereof;

a second restraining member for restraining said trailing shutter member at the cocked position thereof;

means for driving said second restraining member to release the restraint thereby and actuate said trailing shutter member, said magnetic means retaining said second restraining meber at the restraining position thereof against said means for driving during said time period;

mechanical means for holding said second restraining member against said means for driving, independently of the actuation of said magnetic means; and an operating member movable in one direction and provided with first release means for releasing the restraint of said leading shutter member to actuate the latter and commence exposure, and further provided with means for releasing the retaining of said mechanical means and enabling said driving means to drive said second restraining member when said operating member travels a predetermined distance after the actuation of said first release means.

2. A slit shutter mechanism as claimed in claim 1, wherein said operating member is provided with, as said releasing and enabling means, a projection engageable with said mechanical means for releasing the retainment thereby with the movement of said operating member.

3. In an electrically controlled slit shutter for photographic cameras including a leading and a trailing shutter member, each respectively restrainable by a separate restraining member at their cocked position, means for releasing the restraint of the restraining member on the leading shutter member and magnetic means associated with said restraining member for controlling the restraint of the trailing shutter member, said magnetic means being controllable through an electric circuit for determining exposure time electrically, the combination including:

driving means for driving said restraining member for said trailing shutter member to bring the latter away from the restraining position thereof and release said trailing shutter member;

timing means for allowing the actuation of said driving means after a lapse of time from the release of said leading shutter member; and an operating member movable in one direction in response to a shutter releasing operation, said operating member including attached thereto at least a portion of said timing means and also including attached thereto, as said means for releasing, first release means for releasing the restrain of the restraining member on said leading shutter member.

4. A slit shutter as claimed in claim 3 wherein said driving means includes a spring to urge said restraining member for said trailing shutter member against the restraining force of said magnetic means, and wherein said timing means also includes a retaining member for retaining said restraining member at the restraining position thereof against the force of said spring, and wherein said timing means attached to said operating member includes a second release means to release the retainment of said retaining member when said operating member has traveled a predetermined distance after said first release means on said operating member releases said leading shutter member.

5. A slit shutter as claimed in claim 4 further comprising means for selecting diaphragm aperture and wherein said operating member further includes means for actuating said diaphragm apertures selecting means.

6. A slit shutter as claimed in claim 4 wherein said operating member is attached to a spring means for moving same and wherein said second release means comprises a transmission member for transmitting the force of said spring means to said retaining member through interconnection with the latter, said transmission member being so arranged as to be mechanically interconnected with said retaining member when said operating member has traveled a predetermined distance after said first release means on said operating member releases said leading shutter member.

7. An electrically-controlled shutter mechanism for photographic cameras which assures the formation of an exposure slit therebetween which comprises a leading shutter member, a trailing shutter member, a means connected to said leading shutter member to move said leading shutter member and commence exposure, a means connected to said trailing shutter member to move said trailing shutter member and end exposure, a first restraining means for maintaining said leading shutter member in a cocked position against said means connected thereto to move same, a second restraining means for maintaining said trailing shutter member in a cocked position against said means connected thereto to move same, means for moving said first restraining means so that said first restraining means will release said leading shutter member, and means for controlling said second restraining means so that said second restraining means will release said trailing shutter member at a predetermined time after the release of said first restraining member; said means for controlling said second restraining means including a magnet means which is connected to and activated by battery-operated electronic circuit, said magnet means when activated functioning to bias said second restraining means against movement thereof and against release of said trailing shutter member, said means for controlling said second restraining means also including driving means for moving said second restraining means away from said magnet means and to thereby release restrainment of said trailing shutter member and timing means which allows said driving means to move said second restraining member after a predetermined time after release of said leading shutter member; said driving means comprising a spring means connected to said second restraining means to bias said second restraining means away from said magnet means and act to move said second restraining means and to release said trailing shutter member when said magnet means is inactivated by said electronic circuit.

8. The mechanism of claim 7, wherein said timing means includes a safety means which is positioned to contact said second restraining means when in the restraining position thereof and thus bias said second restraining means against movement thereof away from said magnet means, and a means for contacting said safety means to move said safety means out of contact with said second restraining means to allow said spring means to move said second restraining means and release its restrainment of said trailing shutter member when said magnet means is inactivated by said electronic circuit.

9. The mechanism of claim 8, wherein said means for contacting said safety means comprises a first arm member connected to an operating member, said operating member being connected to spring means for moving said operating member in response to a shutter-releasing operation.

10. The mechanism of claim 9, wherein said means for moving said first restraining means comprises a second arm member connected to said operating member.

11. The mechanism of claim 10, wherein said safety means is positioned to bias said second restraining means against movement thereof by a spring attached to said safety means, said spring attached to said safety means being stronger in force than said driving means alone but weaker in force than the sum of the forces of said driving means and said spring means connected to said operating member.

12. The mechanism of claim 11, wherein said driving means comprises a spring.

13. An electrically-controlled shutter mechanism for photographic cameras which assures the formation of an exposure slit therebetween which comprises a leading shutter member, a trailing shutter member, a means connected to said leading shutter member to move said leading shutter member and commence exposure, a means connected to said trailing shutter member to move said trailing shutter member and end exposure, a first restraining means for maintaining said leading shutter member in a cocked position against said means connected thereto to move same, a second restraining means for maintaining said trailing shutter member in a cocked position against said means connected thereto to move same, means for moving said first restraining means so that said first restraining means will release said leading shutter member, and means for controlling said second restraining means so that said second restraining means will release said trailing shutter member at a predetermind time after the release of said first rsstraining member; said means for controlling said second restraining means including a magnet means which is connected to and activated by battery-operated electronic circuit, said magnet means when activated functioning to bias said second restraining means against movement thereof and against release of said trailing shutter member, said means for controlling said second restraining means also including driving means for moving said second restraining means away from said magnet means and to thereby release restrainment of said trailing shutter member and timing means which allows said driving means to move said second restraining member after a predetermined time after release of said leading shutter member; said driving means comprising a first arm member attached to an operating member, said operating member being connected to a spring means to move said operating member in response to a shutter-releasing operation.

14. The mechanism of claim 13, wherein a spring means is connected to said second restraining means to bias said second restraining means against movement thereof and against release of said trailing shutter member.

15. The mechanism of claim 14, wherein the force of said spring means connected to said operating member is stronger in force than the force of said spring means connected to said second restraining means.

16. The mechanism of claim 15, wherein said means for moving said first restraining means comprises a second arm member connected to said operating member.

17. A slit shutter mechanism having a leading shutter member and a trailing shutter member and controllable by an electric circuit through magnetic means which restrains said trailing shutter member at a cocked position thereof for a time period determined by said electric circuit after said leading shutter member has been released, said slit shutter mechanism comprising:

a first restraining member for restraining said leading shutter member at the cocked position thereof;

a second restraining member for, in association with said magnetic means, restraining said trailing shutter member at the cocked position thereof;

means for driving said second restraining member to release the restraint thereby and actuate said trailing shutter member;

an operating member movable in one direction and provided with first release means for releasing the restraint of said leading shutter member to actuate the latter and commence exposure, and further provided with means for enabling, when said operating member travels a predetermined distance after the actuation of said first release means, said driving means to drive said second restraining member and terminate the exposure;

a spring for baising said second restraining member at the restraining position thereof; and wherein said operating member includes an engaging member engageable with said second restraining member to bring the latter away from its restraining position against the biasing of said spring with the movement of said operating member.

* * * * *